United States Patent
Murphy et al.

(10) Patent No.: US 8,201,436 B2
(45) Date of Patent: Jun. 19, 2012

(54) CALIBRATION

(75) Inventors: David J. Murphy, Helsinki (FI);
Markus Kahari, Helsinki (FI); Antti Sorvari, Itasalmi (FI); Yka Huhtala, Helsinki (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 12/226,788

(22) PCT Filed: Apr. 28, 2006

(86) PCT No.: PCT/IB2006/001620
§ 371 (c)(1),
(2), (4) Date: Jun. 22, 2009

(87) PCT Pub. No.: WO2007/125377
PCT Pub. Date: Nov. 8, 2007

(65) Prior Publication Data
US 2010/0018285 A1    Jan. 28, 2010

(51) Int. Cl.
*G01C 25/00* (2006.01)
(52) U.S. Cl. .......................................................... 73/1.76
(58) Field of Classification Search ........................ None
See application file for complete search history.

(56) References Cited

U.S. PATENT DOCUMENTS

| 6,310,644 B1 | 10/2001 | Keightley | 348/159 |
| 6,594,600 B1 | 7/2003 | Arnoul et al. | 702/94 |

FOREIGN PATENT DOCUMENTS

| JP | 2001506369 A | 5/2001 |
| JP | 2004328077 A | 11/2004 |
| JP | 2007263064 A | 10/2007 |
| WO | WO-2004/084124 A1 | 9/2004 |
| WO | WO 2006/070047 A1 | 7/2006 |

OTHER PUBLICATIONS

Sportvision, Inc., "Race F/x Technology", (2010), (1 page).
"The Super Puck Technology", (2 pages).

*Primary Examiner* — Robert R Raevis
(74) *Attorney, Agent, or Firm* — Harrington & Smith

(57) ABSTRACT

A method of calibrating a device comprising:
imaging an object in a viewfinder of a device;
obtaining a device location from a location mechanism and a device orientation from an orientation mechanism; and
using the obtained device location and device orientation to calibrate one or more of the location mechanism and the orientation mechanism such that a difference between an expected location of the object in the viewfinder and a location of the object in the viewfinder is reduced.

26 Claims, 2 Drawing Sheets

CALIBRATION

FIELD OF THE INVENTION

Embodiments of the present invention relate to calibration. In particular, they relate to a method, a device and a computer program for calibrating a device location mechanism and/or a device orientation mechanism.

BACKGROUND TO THE INVENTION

It is becoming more common for electronic devices to use 'context' information. That is information that relates the electronic device to the real-world. Examples of such context information include the location of the device and the orientation of the device.

The location of a device may be determined by a location mechanism housed in the device and an orientation of a device may be determined by an orientation mechanism housed in the device.

Different technologies may be used for determining location. A number of positioning technologies exist such as, for example, base station triangulation, Global Positioning System (GPS) etc. However, any location mechanism may be subject to time varying drift or noise. A number of orientation technologies exist such as, for example, three dimensional compasses using magnetometers, gyroscopes, accelerometers etc. However, any orientation mechanism may be subject to time varying drift or noise.

It would therefore be desirable to compensate for variations in the accuracy of a location mechanism and/or the orientation mechanism.

BRIEF DESCRIPTION OF THE INVENTION

According to one embodiment of the invention there is provided a method of calibrating a device comprising:
imaging an object in a viewfinder of a device;
obtaining a device location from a location mechanism and a device orientation from an orientation mechanism; and
using the obtained device location and device orientation to calibrate one or more of the location mechanism and the orientation mechanism such that a difference between an expected location of the object in the viewfinder and a location of the object in the viewfinder is reduced.

According to another embodiment of the invention there is provided a device comprising:
a viewfinder for imaging an object;
a location mechanism for providing a device location;
an orientation mechanism for providing a device orientation; and
a calibrator for controlling the device location and/or the device orientation such that a difference between an expected location of the object in the viewfinder and a location of the object in the viewfinder is reduced.

According to a further embodiment of the invention there is provided a record medium embodying a computer program for using the output from an orientation mechanism, the output from a location mechanism, the location of a predetermined object and the location of an image of the predetermined object within a viewfinder to calibrate the output from the location mechanism and/or the output from the orientation mechanism.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
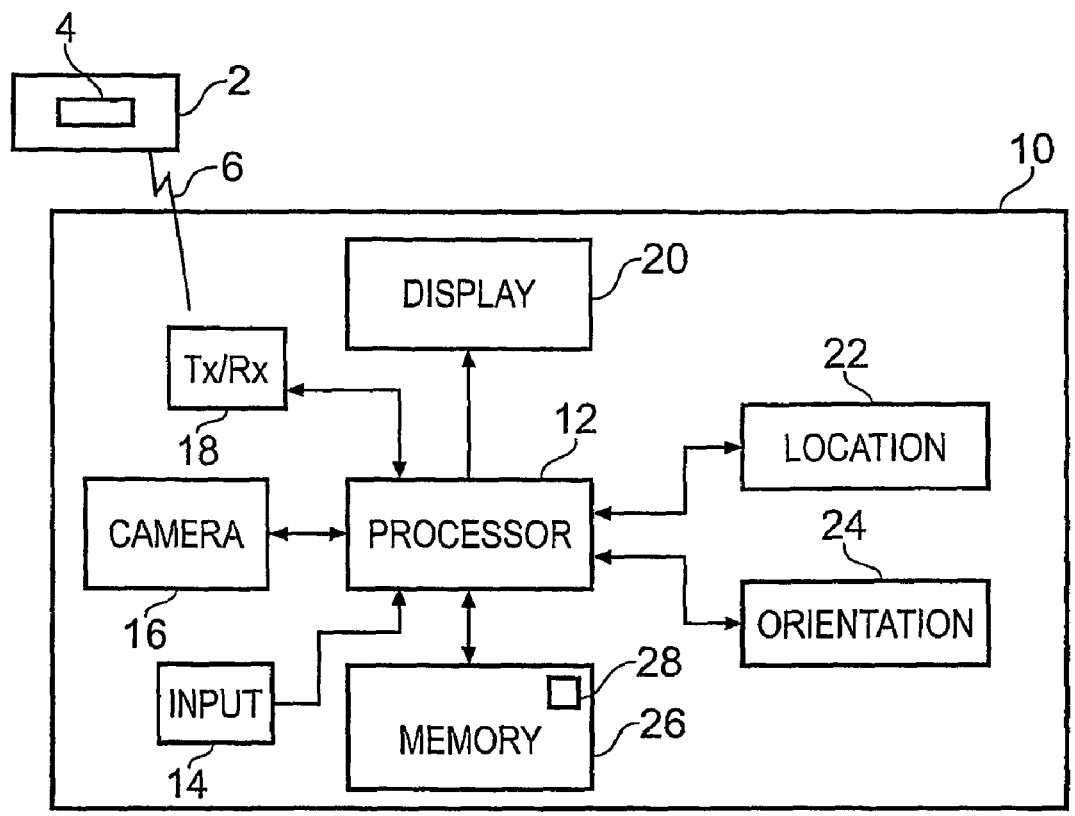
FIG. 1 schematically illustrates an electronic device for performing a calibration process.

The Figures illustrate a method of calibrating a device 10 comprising: imaging an object 30 in a viewfinder 20 of a device 10; obtaining a device location from a location mechanism 22 and a device orientation from an orientation mechanism 24; and using the obtained device location and device orientation to calibrate one or more of the location mechanism 22 and the orientation mechanism 24 such that a difference between an expected location of the object 30 in the viewfinder 20 and a location of the object 30 in the viewfinder 20 is reduced.

FIG. 1 schematically illustrates an electronic device 10. In the example illustrated the electronic device is a hand-portable camera mobile cellular telephone, however, in other embodiments the electronic device may be any processing device that receives camera images such as a personal computer, a personal digital assistant or a digital camera.

In FIG. 1 only the functional components that are necessary for describing the operation of the device in the following paragraphs are illustrated. It should be appreciated that different and/or additional components may be used in other implementations. For example, although a processor and memory combination is illustrated, in other embodiments an ASIC may be used.

The electronic device comprises: a processor 12 for controlling the operation of the device 10, an input device for enabling a user to control the processor, a digital camera 16 for capturing an image, a radio transceiver 18 for communicating with a database 4 in a remote memory store 2 that stores the locations of different predetermined objects, a display 20 which is operable as a viewfinder for the camera 16, a location mechanism 22 which detects the location of the device 10 and provides the device location to the processor 12, an orientation mechanism 24 which detects the orientation of the device 10 and provides the device orientation to the processor 12, and a memory 26 which stores computer program instructions 28.

The computer program instructions 28, when loaded into the processor 12, enable the processor 12 to operate as a calibrator. The calibrator adapts the outputs of the location mechanism 22 and the orientation mechanism 24. This may be achieved by varying the operation of the respective mechanisms or by compensating the outputs from the respective mechanisms.

Figure 3:
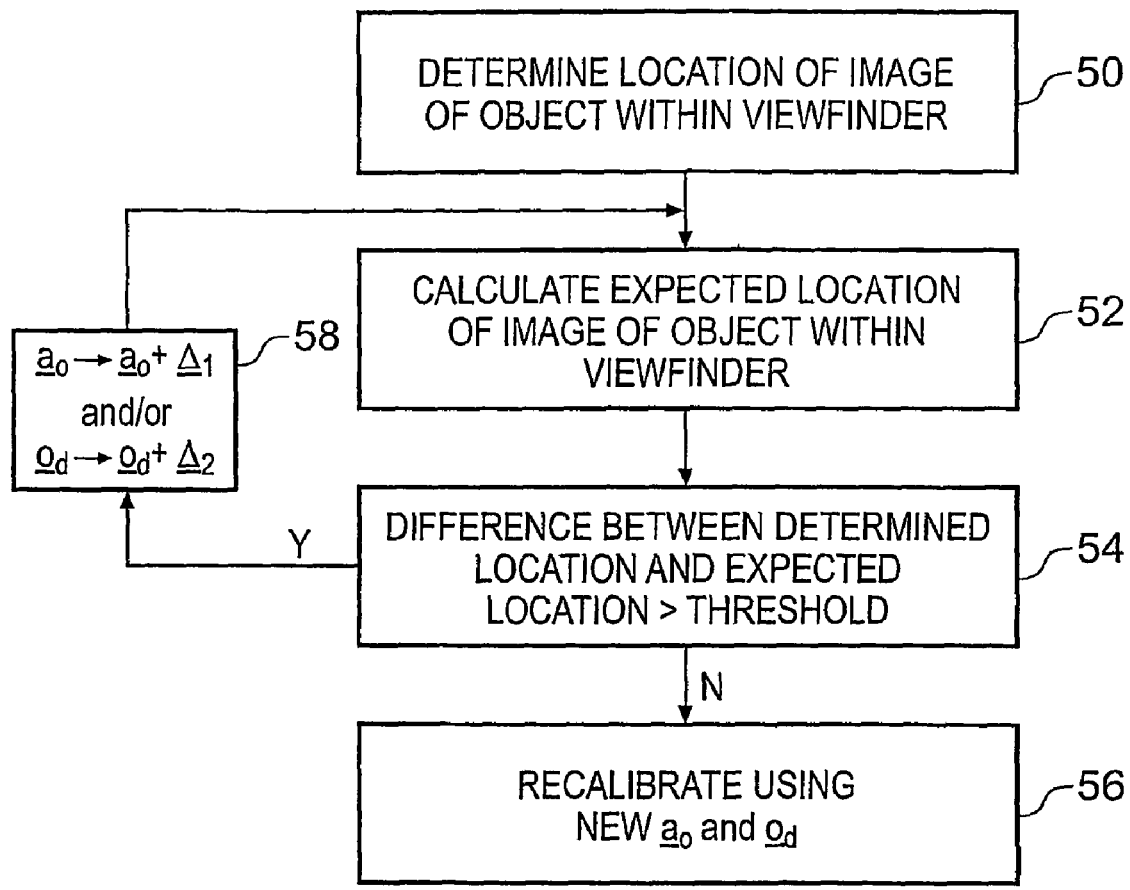
FIG. 3 illustrates an example of one possible calibration process.
Figure 4:
FIG. 4 illustrates a physical entity embodying computer program instructions.

The computer program instructions 28 provide the logic and routines that enables the electronic device to perform the method illustrated in FIG. 3.

The computer program instructions may arrive at the electronic device 10 via an electromagnetic carrier signal or be copied from a physical entity 60 such as a computer program product, a memory device or a record medium such as a CD-ROM or DVD.

In this example, the location mechanism is a GPS receiver and the orientation mechanism is a 3D compass but in other embodiments other location mechanisms and/or orientation mechanism may be used. An orientation mechanism may, for example, comprise a magnetometer which can provide a compass bearing and a gravimeter (accelerometer, gyroscope etc) which can provide a vertical reference. In combination, they provide a three dimensional bearing.

Figure 2:
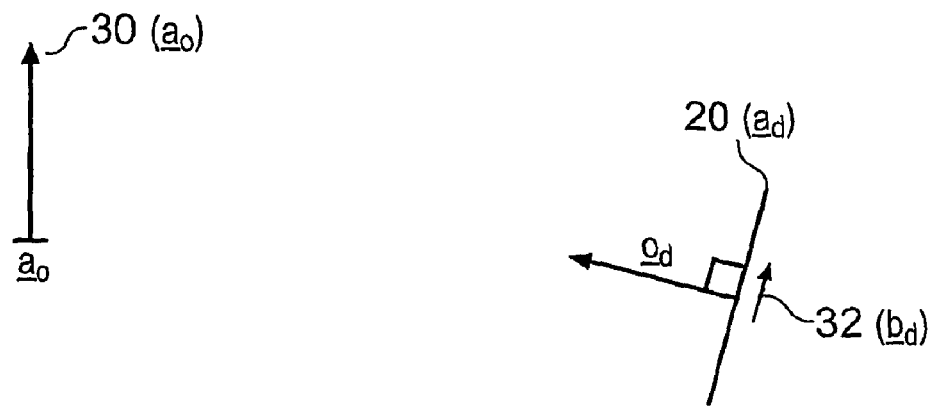
FIG. 2 schematically illustrates imaging of a predetermined object 30 by the device.

FIG. 2 schematically illustrates the imaging of a predetermined object 30 by the device 10. The object 30 is predetermined in the sense that its location $a_o$ is already stored in the database 4. The viewfinder 20 of the device 10 is located at $a_d$ as determined by the location mechanism 22. The plane of the viewfinder 20 is orthogonal to the unitary vector $o_d$ which may be determined by the orientation mechanism 24. An image 32 of the predetermined object 30 is at a location $b_d$ within the plane of the viewfinder 20. The vectors $a_o$, $a_d$, and $o_d$ are three dimensional vectors.

Without calibration, an expected location of the image 32 of the predetermined object 30 in the viewfinder 20 is $(k*(a_o-a_d) \times o_d)$. This will typically be different from the actual location $b_d$ of the image 32 of the predetermined object 30 in the viewfinder 20. The difference between the expected location of the image of the predetermined object 30 in the viewfinder and the location of the image of the predetermined object 30 in the viewfinder is reduced by calibration.

The calibrator 12 modifies $a_d$ and/or $o_d$ so that $b_d = k*(a_o-a_d) \times o_d$ i.e. so that the expected location of the image of the predetermined object 30 in the viewfinder $(k*(a_o-a_d) \times o_d)$ becomes equal to the actual location of the image of the predetermined object 30 in the viewfinder $b_d$.

The calibrator 12 therefore receives:
a) a scaling constant k, from the camera 16, that varies with the zoom used to image the predetermined object 30,
b) the actual location of the predetermined object $a_o$ from the transceiver 18 after it has downloaded it from the remote database 4 over a wireless connection 6,
c) the device location $a_d$ provided by the location mechanism 22,
d) the unitary orientation vector $o_d$ of the device, provided by the orientation mechanism 24 and
e) the location $b_d$ of the image of the predetermined object 30 within the viewfinder 20 which can be determined by identifying the image 32 of the predetermined object 30 as a series of pixels within the display 20 of the viewfinder and determining the location of those pixels in the plane of the display 20. This may be achieved by framing a physical landmark comprising the image of the predetermined object in a box presented in the viewfinder.

An example of one possible calibration process is illustrated in FIG. 3.

The process starts at step 50 perhaps in response to a user input via the input device 14. The calibrator 12 determines the location $b_d$ of the image 32 of the predetermined object 30 within the viewfinder 20.

Next at step 52, the calibrator 12 calculates an expected location $(k*(a_o-a_d) \times o_d)$ of an image of the predetermined object 30 in the viewfinder 20.

Next at step 54, the calibrator 12 compares the determined location $b_d$ of the image of the predetermined object 30 within the viewfinder and the expected location $(k*(a_o-a_d) \times o_d)$ of an image of the predetermined object 30 in the viewfinder, if the difference exceeds a threshold T then the process branches to step 58, otherwise the process moves on to step 56.

At step 58, the calibrator 12 adapts the value(s) $a_o$ and/or $o_d$ used to calculate the expected location of an image of the predetermined object 30 in the viewfinder 20. The size of the adaptation may be determined using a suitable algorithm.

After step 58, the process returns to step 52.

At step 56, the calibrator 12 recalibrates the location mechanism 22 using the current value of $a_o$ and the orientation mechanism 24 using the current value of $o_d$.

Although the process has been described in relation to a single object 30, the process can occur simultaneously for multiple objects where the multiple objects are parts of the same physical object or parts of different physical objects. The physical object will typically be a landmark.

The multiple objects may be, for example, the topmost, bottommost, leftmost, and rightmost portions of a physical object such as a building or monument.

The method may be repeated for multiple orientations of the device 10. That is the same predetermined object or objects are still imaged by the viewfinder 20 but with a different orientation of the device 10.

The method may be repeated for multiple locations of the device 10. That is the same predetermined object or objects are still imaged by the viewfinder 20 but with a different location of the device.

After calibration, when an object 30 is imaged in a display viewfinder 20, the device 10 can determine $b_d$ and then after obtaining $a_d$ from its location mechanism 22 and $o_d$ from its orientation mechanism 24, it can calculate $a_o$ using $b_d = k*(a_o-a_d) \times o_d$. The device 10 is therefore able to associate an object 30 imaged in the display viewfinder 20 with a real world location $a_o$. Data that has been associated with that real world location $a_o$ may therefore be displayed on the display viewfinder 20 at the display location $b_d$ or a link to the data may be displayed on the display viewfinder 20 at the display location $b_d$.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
imaging at least a portion of an object in a viewfinder of a device;
obtaining a device location from a location mechanism and a device orientation from an orientation mechanism; and
using the obtained device location and device orientation to calibrate one or more of the location mechanism and the orientation mechanism such that a difference between an expected location of the object in the viewfinder and a location of the object in the viewfinder is reduced.

2. A method as claimed in claim 1, wherein calibrating one or more of the location mechanism and the orientation mechanism minimizes the difference between the expected location of the object in the viewfinder and the location of the object in the viewfinder.

3. A method as claimed in claim 1, further comprising:
calculating an expected location of the object within the viewfinder using the device location and the device orientation; and
comparing the expected location of the object in the viewfinder and the location of the object in the viewfinder as part of the calibration step.

4. A method as claimed in claim 1, further comprising;
calculating an expected location of the object within the viewfinder using a location of the object and a scaling factor.

5. A method as claimed in claim 4, wherein the location of the object is downloaded from a remote store.

6. A method as claimed in claim 4, further comprising varying the scaling factor with the zoom factor used with the viewfinder.

7. A method as claimed in claim 1, wherein the at least a portion of the object is a portion of a physical object.

8. A method as claimed in claim 1, comprising:
imaging a plurality of at least a portion of objects in the viewfinder of the device; and
using the obtained device location and device orientation to calibrate one or more of the location mechanism and the orientation mechanism such that, for each of the plurality of at least a portion of objects, a difference between an expected location of the object in the viewfinder and a location of the object in the viewfinder is reduced.

9. A method as claimed in claim 8, wherein the plurality of at least a portion of objects are portions of the same physical object.

10. A method as claimed in claim 1, repeated for the same object using at least a different orientation of the device.

11. A method as claimed in claim 1, repeated for the same object using at least a different location of the device.

12. A method as claimed in claim 1, further comprising framing a physical landmark comprising the object in a box presented in the viewfinder.

13. A method as claimed in claim 1 wherein the viewfinder is a display.

14. A method as claimed in claim 1 wherein the orientation mechanism and the location mechanism are located in the device.

15. A method as claimed in claim 1 wherein the location mechanism is a GPS receiver.

16. A method as claimed in claim 1, wherein the orientation mechanism comprises a 3D compass and a gravimeter.

17. A device comprising:
a viewfinder configured to image an object;
a location mechanism configured to provide a device location;
an orientation mechanism configured to provide a device orientation; and
a calibrator configured to control one or more of the device location and the device orientation such that a difference between an expected location of the object in the viewfinder and a location of the object in the viewfinder is reduced.

18. A device as claimed in claim 17, wherein the calibrator is configured to calculate an expected location of the object within the viewfinder using the device location and the device orientation and configured to compare the expected position and the determined position.

19. A device as claimed in claim 17, configured to download a location of the object from a remote store, wherein calculating the expected location of the object within the viewfinder additionally uses the downloaded location of the object.

20. A device as claimed in claim 17, further comprising a zoom function associated with the viewfinder for zooming in on a portion of the image in the viewfinder, wherein an indication of the current zoom factor is provided to the calibrator.

21. A device as claimed in claim 17, wherein the calibrator calculates an expected location of an object within the viewfinder for each of a plurality of objects imaged in the viewfinder and adjusts the device location and/or device orientation such that a difference between an expected location and a location is reduced for each of a plurality of objects imaged in the viewfinder.

22. A device as claimed in claim 17, wherein the viewfinder is a display.

23. A device as claimed in claim 17, wherein the location mechanism is a GPS receiver.

24. A device as claimed in claim 17, wherein the orientation mechanism is configured to provide a three dimensional bearing.

25. A non-transitory computer readable medium embodying a computer program which when loaded into a processor, enables the processor to use an output from an orientation mechanism, an output from a location mechanism, a location of a predetermined object and a location of an image of a predetermined object within a viewfinder to calibrate the output from the location mechanism and/or the output from the orientation mechanism.

26. A non-transitory computer readable medium as claimed in claim 25, wherein the computer program is operable to adapt the output from the location mechanism and/or the output from the orientation mechanism to reduce a difference between an expected location of an image of the predetermined object in a viewfinder and a location of the image of the predetermined object in the viewfinder.

* * * * *